Feb. 6, 1962     R. L. BROWN     3,019,498
DEFORMABLE PLASTIC FASTENER
Filed Dec. 3, 1959       2 Sheets-Sheet 1
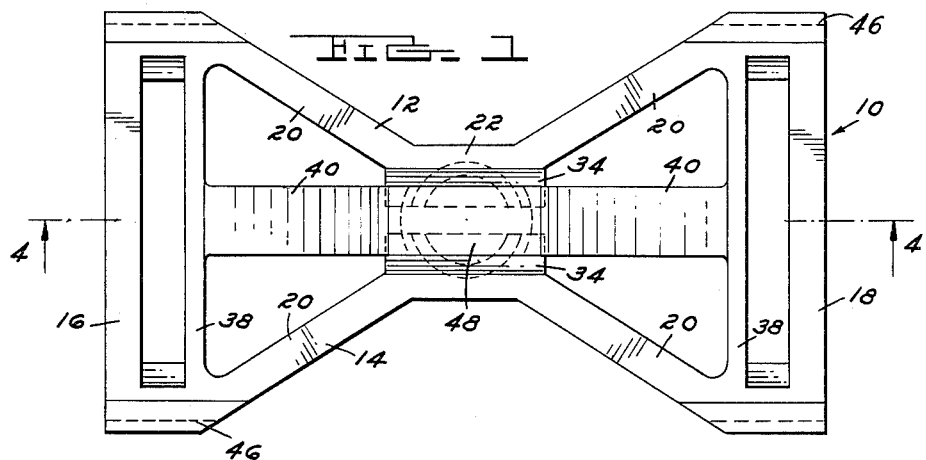
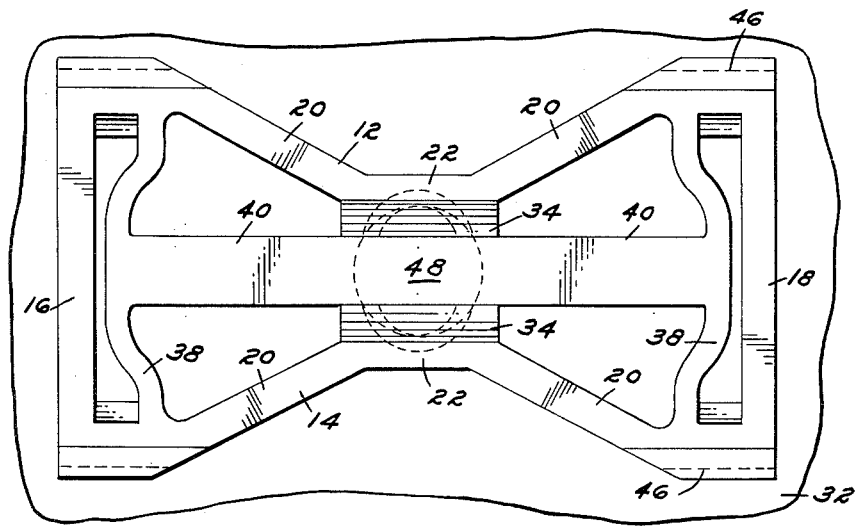
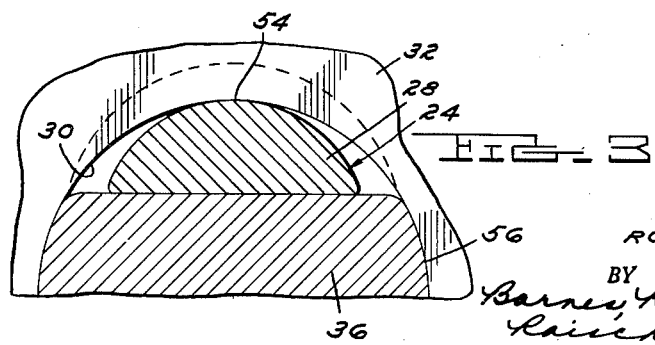
INVENTOR.
ROBERT L. BROWN
BY
ATTORNEYS Feb. 6, 1962   R. L. BROWN   3,019,498
DEFORMABLE PLASTIC FASTENER
Filed Dec. 3, 1959   2 Sheets-Sheet 2
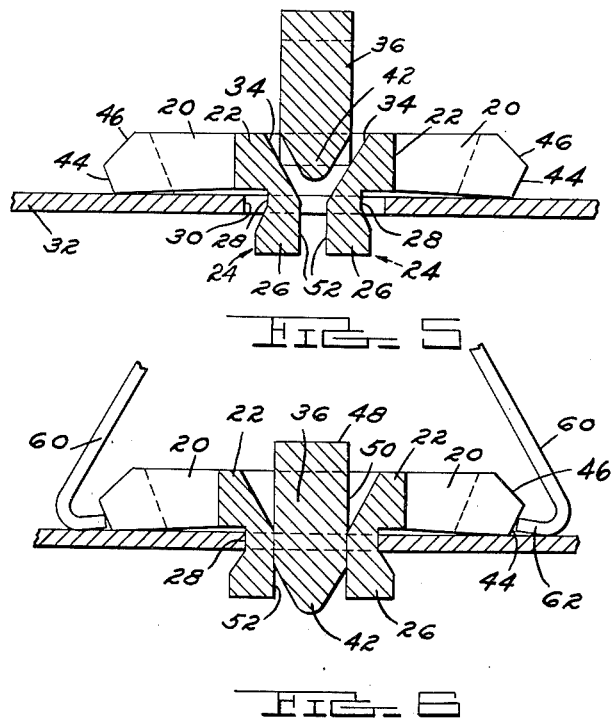
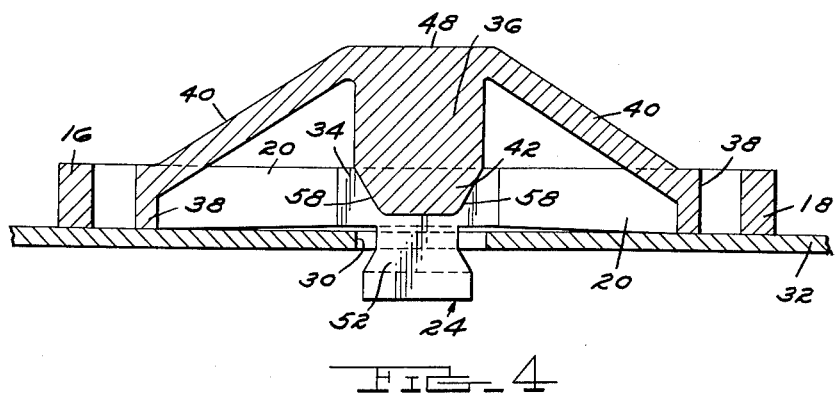
INVENTOR.
ROBERT L. BROWN
BY
ATTORNEYS United States Patent Office 3,019,498
Patented Feb. 6, 1962

3,019,498
DEFORMABLE PLASTIC FASTENER
Robert L. Brown, Ferndale, Mich. (Robin Products Co., 27927 Groesbeck Highway, Warren, Mich.)
Filed Dec. 3, 1959, Ser. No. 857,072
14 Claims. (Cl. 24—73)

This invention relates to a fastener and more particularly to a fastener of the type utilized for securing trim moldings on sheet metal panels.

It is an object of the present invention to provide a fastener of the type described which can be molded economically from a plastic material such as "nylon" and which enables securely mounting the fastener on an apertured panel from the side thereof to which the molding is to be applied.

In the drawings:

FIG. 1 is a top elevational view of the fastener of this invention.

FIG. 2 is a view similar to FIG. 1 and showing the fastener securely mounted on an apertured panel.

FIG. 3 is a fragmentary sectional view of a portion of the fastener in the condition illustrated in FIG. 2.

FIG. 4 is a sectional view taken along the line 4—4 in FIG. 1.

FIGS. 5 and 6 are transverse vertical sectional views illustrating the manner in which the fastener is mounted on a supporting panel.

Referring to the drawings, and particularly to FIGS. 1 and 4, the fastener of the present invention comprises a base generally designated 10 which includes a pair of longitudinally extending members 12 and 14 connected together at their ends by transverse members 16 and 18. The longitudinally extending members 12 and 14 and the transversely extending members 16 and 18 all lie in substantially a flat plane. The longitudinally extending members 12, 14 are constituted by inwardly inclined leg portions 20 extending generally from the outer ends of the transverse members 16, 18. The inner ends of the leg portions 20 of each of the longitudinal members 12, 14 are integrally joined by a central connecting portion 22. The two connecting portions 22 are spaced apart transversely of base 10 and extend downwardly below the plane of base 10 as lugs 24. Each lug 24 has a lower enlarged end 26 joined to the connecting portion 22 by an inwardly necked portion 28. Each lug 24 in horizontal section is generally semi-circular in shape so that the two lugs cooperate to provide an annular formation which is adapted to be inserted through a circular opening 30 in a supporting panel 32 when the base 10 of the fastener is seated against one face of the panel as shown in FIG. 5. The two connecting portions 22 are fashioned with inwardly and downwardly inclined flat faces 34 which cooperate to form an inwardly and downwardly tapered pilot slot for the hereinafter described expanding plug 36.

Adjacent each end of base 10 and spaced inwardly from the transverse members 16, 18, there is provided a transversely extending rib 38. As viewed in FIGS. 1 and 2, ribs 38 have a thickness substantially less than transverse members 16, 18. These ribs are proportioned in thickness such that they are readily deformable or bendable in a direction longitudinally of base 10 in relation to the transverse members 16, 18.

To the central section of each rib 38, there is integrally joined an upwardly and inwardly extending strut 40. The upper ends of struts 40 connect with the expanding plug 36 as illustrated in FIG. 4. The lower end of plug 36 is formed with a wedge-shaped nose portion 42 which is normally disposed between the tapered faces 34 on the connecting portions 22.

The four outer corners of base 10 are of relatively heavy section as is apparent from FIGS. 1 and 2. The longitudinal side edges of these corners are undercut as at 44 and the top faces of these corners are flared outwardly and downwardly as at 46. The fastener is admirably suited for molding as a single piece from a plastic material.

In securing the fastener to a sheet metal panel such as illustrated at 32, the lugs 24 are inserted through the opening 30 in the panel so that the base 10 of the fastener is seated against the outer or top surface of the panel 32 to which a trim molding is to be applied. Thereafter, the upper end face 48 of the expanding plug 36 is struck as by a hammer blow to drive the plug downwardly between lugs 24. As the wedge shaped nose portion 42 engages the inwardly tapered faces 34 of the connecting portions 22, lugs 24 are progressively spread apart until the straight vertical faces 50 of plug 36 engage the opposed straight vertical faces 52 at the inner sides of lugs 24. The necked-in portions 28 of lugs 24 are thus spread laterally apart and into tight engagement with diametrically opposite edge portions of opening 30 in the panel as indicated at 54 in FIG. 3. The enlarged lower ends 26 of lugs 24 engage the underside of the panel 32 as illustrated in FIG. 5 to effectively and securely mount the fastener on panel 32.

As is shown in FIG. 3, the end faces 56 of plug 36 are rounded and the dimension of the plug between these faces corresponds generally to the diameter of aperture 30. The fastener is centered with respect to aperture 30 by the inwardly tapered ends 58 at the lower ends of the rounded faces 56.

As expanding plug 36 is driven downwardly between the lug portions 24, it will be noted that the upwardly inclined struts 40 are bent downwardly about their connections with ribs 38 into the plane of base 10. Struts 40, where they connect with plugs 38 and ribs 39, are sufficiently flexible to accommodate this bending. However, struts 40 are relatively rigid in a longitudinal direction; and as they are displaced downwardly into the plane of base 10, their outer lower ends bend the ribs 38 outwardly away from one another and towards the rigid transverse members 16, 18 as is illustrated in FIG. 2.

After the fastener or a plurality of such fasteners are mounted on panel 32 as described, a trim molding 56 having inwardly turned edges 58 may be engaged with the fasteners by snapping the edges 58 of the molding over the surfaces 46, 44 at the four corners of the fastener.

I claim:

1. A fastener comprising a base member having means forming an apertured expandable lug depending from the lower face thereof, said lug being adapted to extend through an opening in a panel on which the base member is seated and expanded to lock the fastener to the panel, said lug being located intermediate the opposite ends of said base, said base having adjacent each of said opposite ends a transversely extending, readily laterally deformable rib, an expanding plug located above and in axial alignment with the expandable lug, and a pair of struts each connected at one end to one of said ribs and at the other end to said plug, said struts being relatively rigid in axial direction and inclining upwardly and inwardly from the plane of said base to said plug whereby the length of said struts measured from said rib to the axial center of the plug is greater than the distance between each rib and the axial center of said apertured plug, said struts being bendable at their connection with said plug and ribs.

2. A fastener as called for in claim 1 wherein the fastener is formed of a plastic material.

3. A fastener as called for in claim 1 wherein said base is provided at the opposite lateral edges thereof with molding retaining portions over which the edges of an inwardly flanged molding are adapted to be snapped into engagement.

4. A fastener as called for in claim 1 wherein said ribs are substantially more flexible in a direction parallel to the plane of said base than in a direction perpendicular to the plane of said base.

5. A fastener comprising a base of generally open frame work, said base including longitudinally extending members connected together adjacent their opposite ends by a pair of relatively rigid, transversely extending members, said base also including a pair of transversely extending ribs, one adjacent but spaced inwardly from each of said relatively rigid, transversely extending members, said ribs being readily deformable in a direction parallel to the plane of said base and transversely of said rigid members, said base having at a generally longitudinally central location lug means which are adapted to be inserted through an opening on a panel on which the base is seated, said lug means being adapted to be spread apart to engage the edges of the opening and thereby mount the fastener on the panel, an expanding plug disposed above and in axial alignment with said lug means, said plug when driven downwardly engaging said lug means and spreading them apart to lock the fastener on the panel, and a pair of struts each connected at one end to one of said ribs and at the other end to said plug, said struts being relatively rigid in axial direction and inclining upwardly from the plane of said base to said plug whereby when the plug is driven downwardly, said lug means engage the opening in the panel to secure the fastener on the panel and said ribs are bent outwardly away from each other towards said rigid members to retain said plug in position engaging and expanding said lug means.

6. A fastener as called for in claim 5 wherein said relatively rigid, transversely extending members are provided with molding retaining portions at the opposite ends thereof.

7. A fastener as called for in claim 5 wherein said lug means comprise a pair of spaced apart, depending lug portions each connected with one of said longitudinal members.

8. A fastener comprising a base which includes a pair of transversely spaced, longitudinally extending members, the adjacent end portions of said members being connected together by relatively rigid, transversely extending members at opposite ends of said base, said longitudinally extending members each having adjacent the longitudinal central portion thereof a lug depending below the plane of the base, said lugs being adapted to be inserted through an opening in a panel on which the base is seated and thereafter spread apart to engage the lugs with opposite edge portions of the opening and thereby secure the fastener to the panel, a pair of ribs on said base extending transversely between said longitudinally extending members and symmetrically arranged with respect to said lugs, said ribs being spaced longitudinally from said lugs one toward each of the opposite ends of said base, said ribs being relatively rigid in a direction perpendicular to the plane of said base, but being readily deformable in a direction parallel to the plane of said base, each rib having a strut connected to the central portion thereof which extends in a direction upwardly of said base and towards said lugs, and an expanding plug disposed above and in axial alignment with said pair of lugs, the upper end of each strut being connected with and supporting said plug, the connections between said struts and the ribs and the plug being flexible to permit driving the plug downwardly between said lugs to thereby bend said struts toward the plane of said base and bend said ribs outwardly away from one another.

9. A fastener as called for in claim 8 wherein said ribs are spaced inwardly of said relatively rigid, transversely extending members.

10. A fastener as called for in claim 8 wherein said longitudinally extending members are bowed inwardly towards each other in the plane of said base.

11. A fastener as called for in claim 10 wherein said lugs are disposed at the most inwardly bowed portions of said longitudinally extending members.

12. A fastener as called for in claim 11 including molding engaging portions at opposite ends of said relatively rigid transversely extending members.

13. A fastener as called for in claim 12 wherein the fastener comprises a one-piece plastic molding.

14. A fastener as called for in claim 5 wherein said relatively rigid transversely extending members are each provided with molding retaining portions.

References Cited in the file of this patent

UNITED STATES PATENTS

| | | |
|---|---|---|
| 2,561,006 | Waara | July 17, 1951 |
| 2,611,166 | Wiley | Sept. 23, 1952 |
| 2,748,645 | Peckham et al. | June 5, 1956 |
| 2,887,926 | Edwards | May 26, 1959 |

FOREIGN PATENTS

| | | |
|---|---|---|
| 788,742 | Great Britain | Jan. 8, 1958 |